United States Patent
Yamaguchi et al.

(10) Patent No.: US 9,850,349 B2
(45) Date of Patent: Dec. 26, 2017

(54) MULTICOMPONENT ROOM TEMPERATURE-CURABLE ORGANOPOLYSILOXANE COMPOSITION, CURED PRODUCT OF SAID COMPOSITION, AND MOLDED PRODUCT COMPRISING SAID CURED PRODUCT

(71) Applicant: Shin-Etsu Chemical Co., Ltd., Tokyo (JP)

(72) Inventors: Takahiro Yamaguchi, Annaka (JP); Takafumi Sakamoto, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 15 days.

(21) Appl. No.: 15/106,165

(22) PCT Filed: Oct. 20, 2014

(86) PCT No.: PCT/JP2014/077833
§ 371 (c)(1),
(2) Date: Jun. 17, 2016

(87) PCT Pub. No.: WO2015/093139
PCT Pub. Date: Jun. 25, 2015

(65) Prior Publication Data
US 2017/0306099 A1    Oct. 26, 2017

(30) Foreign Application Priority Data
Dec. 17, 2013  (JP) .................. 2013-260234

(51) Int. Cl.
| | |
|---|---|
| *C08G 77/20* | (2006.01) |
| *C08L 83/04* | (2006.01) |
| *C08G 77/18* | (2006.01) |
| *C08G 77/50* | (2006.01) |
| *C08K 5/56* | (2006.01) |
| *C08K 3/26* | (2006.01) |
| *C08K 13/02* | (2006.01) |

(52) U.S. Cl.
CPC ............. *C08G 77/20* (2013.01); *C08G 77/18* (2013.01); *C08G 77/50* (2013.01); *C08K 3/26* (2013.01); *C08K 5/56* (2013.01); *C08K 13/02* (2013.01); *C08L 83/04* (2013.01); *C08L 2205/02* (2013.01); *C08L 2666/44* (2013.01)

(58) Field of Classification Search
CPC ................... C08G 77/18; C08G 77/20
See application file for complete search history.

(56) References Cited

U.S. PATENT DOCUMENTS

| 3,294,739 A | 12/1966 | Weyenberg |
| 3,595,733 A | 7/1971 | Ching et al. |
| 4,111,890 A | 9/1978 | Getson et al. |

(Continued)

FOREIGN PATENT DOCUMENTS

| EP | 2 996 287 A1 | 3/2016 |
| JP | 39-27643 B | 12/1964 |

(Continued)

OTHER PUBLICATIONS

International Search Report dated Jan. 27, 2015 in PCT/JP2014/077833 filed on Oct. 20, 2014.

(Continued)

*Primary Examiner* — Marc Zimmer
(74) *Attorney, Agent, or Firm* — Oblon, McClelland, Maier & Neustadt, L.L.P.

(57) ABSTRACT

Provided is a multicomponent room temperature-curable organopolysiloxane composition capable of providing a cured product superior in fast curability, storage stability and durability. The room temperature-curable organopolysiloxane composition comprises:

(A) an alkoxysilyl-ethylene group-terminated organopolysiloxane having in each molecule at least one silyl-ethylene bond represented by the following structural formula (1)

[Chemical formula 1]

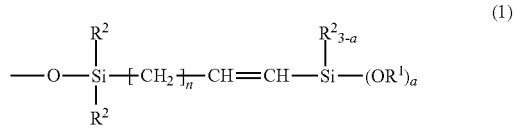

(wherein $R^1$ represents an alkyl group; $R^2$ represents a hydrocarbon group having 1 to 20 carbon atoms; a represents an integer of 1 to 3; and n represents an integer of 0 to 10);

(B) an organopolysiloxane represented by the following general formula (2)

[Chemical formula 2]

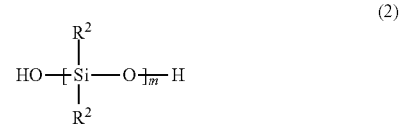

(wherein $R^2$ represents a hydrocarbon group having 1 to 20 carbon atoms; and m represents a number at which such organopolysiloxane exhibits a viscosity of 10 to 1,000,000 mPa·s at 25° C.); and (C) a curing catalyst.

11 Claims, No Drawings

(56) References Cited

U.S. PATENT DOCUMENTS

| | | | | |
|---|---|---|---|---|
| 5,329,036 A | * | 7/1994 | Dougherty | C07F 7/0836 528/32 |
| 2003/0212197 A1 | | 11/2003 | Sakamoto et al. | |
| 2011/0257324 A1 | | 10/2011 | Ziche et al. | |
| 2015/0315428 A1 | | 11/2015 | Sakamoto et al. | |
| 2015/0315438 A1 | | 11/2015 | Sakamoto et al. | |
| 2016/0083524 A1 | | 3/2016 | Katayama et al. | |

FOREIGN PATENT DOCUMENTS

| | | | |
|---|---|---|---|
| JP | 50-6456 | B | 3/1975 |
| JP | 55-43119 | A | 3/1980 |
| JP | 56-122390 | A | 9/1981 |
| JP | 4-283589 | A | 10/1992 |
| JP | 06-248084 | A * | 9/1994 |
| JP | 7-39547 | B2 | 5/1995 |
| JP | 7-331076 | A | 12/1995 |
| JP | 2012-511607 | A | 5/2012 |
| WO | 2014/097573 | A1 | 6/2014 |
| WO | 2014/097574 | A1 | 6/2014 |
| WO | 2014/185276 | A1 | 11/2014 |

OTHER PUBLICATIONS

Search Report dated Jul. 5, 2017 issued in corresponding European patent application No. 14872727.

* cited by examiner

MULTICOMPONENT ROOM TEMPERATURE-CURABLE ORGANOPOLYSILOXANE COMPOSITION, CURED PRODUCT OF SAID COMPOSITION, AND MOLDED PRODUCT COMPRISING SAID CURED PRODUCT

TECHNICAL FIELD

The present invention relates to a room temperature-curable organopolysiloxane composition; a cured product of such composition; and a molded product comprising such cured product. Particularly, the present invention relates to a room temperature-curable organopolysiloxane composition (especially, a multicomponent room temperature-curable organopolysiloxane composition) exhibiting an improved curing speed as a result of combining, at a given ratio and as main ingredients (base polymers), an organopolysiloxane whose terminals are blocked by alkoxysilyl-ethylene groups and an organopolysiloxane whose molecular chain terminals are both blocked by silanol groups (hydroxyl groups bonded to silicon atoms); and a cured product and a molded product of such composition that are superior in heat and moisture resistances (especially, a silicone rubber cured product and a silicone rubber molded product).

BACKGROUND ART

Conventionally, as a room temperature-curable organopolysiloxane composition capable of being cured to obtain an elastomer object (rubber-like elastic body) under a room temperature when coming into contact with water in the air (i.e. room temperature-curable silicone rubber composition), there have been known various types of them exhibiting various types of curing patterns. Particularly, those that are cured by releasing alcohols (dealcoholization type) share a feature of not producing unpleasant odors and a feature of not corroding metals. Therefore, such a type of composition is suitable for use in sealing, bonding and coating electric and electronic equipments.

Typical examples of the above type of composition include a composition consisting of a hydroxyl group-terminated polyorganosiloxane, alkoxysilane and an organic titanium compound; a composition consisting of an alkoxysilyl-terminated polyorganosiloxane, alkoxysilane and alkoxy titanium; a composition consisting of a silethylene group-containing alkoxysilyl-terminated linear polyorganosiloxane, alkoxysilane and alkoxy titanium; and a composition consisting of an alkoxy-α-silylester compound and a hydroxyl group-terminated polyorganosiloxane or alkoxy group-terminated polyorganosiloxane (Patent documents 1 to 4).

Although these compositions exhibit a certain degree of storage stability, water resistance and moisture resistance, they have not yet reached a satisfactory level. Moreover, these compositions have exhibited insufficient fast curabilities.

As mentioned above, polymers having reactive alkoxysilyl groups at their terminals are conventionally known. Since such polymers have their polymer terminal groups previously blocked by alkoxysilyl groups, their curabilities are hard to change (deteriorate) with time, and their storage stabilities are superior. Further, the workability (viscosity, thixotropy) of such polymers can be arbitrarily controlled, and these polymers are also capable of forming cross-linkages and elastomers by reaction with water in the air and exhibiting superior properties (hardness, tensile strength, elongation at break).

However, those of dealcoholization type have exhibited insufficient curabilities due to the fact that their reactivities with water in the air are lower than those of other known curing types such as deoxirnation type, deacetic acid type and deacetone type.

As a solution to such problem, studies have been conducted on functional groups (linking groups) adjacent to reactive alkoxy groups, and it has been reported that an α-alkoxysilylmethyl terminal group has a particularly high reactivity with water in the air (Patent document 5). However, there still exist disadvantages such as an insufficient curability; an adverse impact inflicted upon a durability by adjacent functional groups (linking groups); and a low restorability of a cured product.

PRIOR ART DOCUMENT

Patent Document

Patent document 1: Japanese Examined Patent Application Publication No. Sho 39-27643
Patent document 2: Japanese Unexamined Patent Application Publication No. Sho 55-43119
Patent document 3: Japanese Examined Patent Application Publication No. Hei 7-39547
Patent document 4: Japanese Unexamined Patent Application Publication No. Hei 7-331076
Patent document 5: Japanese Unexamined Patent Application Publication (Translation of PCT Application) No. 2012-511607

SUMMARY OF THE INVENTION

Problem to be Solved by the Invention

Therefore, it is an object of the present invention to provide a room temperature-curable polyorganosiloxane composition that is superior in fast curability and capable of forming a cured product, particularly a silicone rubber cured product superior in storage stability and durability.

Means to Solve the Problem

In order to achieve the aforementioned object, the inventors of the present invention diligently carried out a series of studies, and found that the hydrolyzability of alkoxy groups could be dramatically improved only if a linking group adjacent to an alkoxysilyl group was an ethylene-based unsaturated hydrocarbon. Particularly, the invention was completed in the following manner. That is, the inventors found that by combining, at a given ratio, a silicon compound such as an organopolysiloxane having an alkoxysilyl-ethylene group(s) represented by the following structural formula (1) at terminals and an organopolysiloxane whose molecular chain terminals are both blocked by silanol groups, there could be obtained a room temperature composition that is particularly superior in fast curability and is capable of forming a cured product with a favorable storage stability and durability, especially a room tempera ture-curable organopolysiloxane composition capable of forming a favorable silicone rubber cured product.

That is, the present invention is to provide the following room temperature-curable organopolysiloxane composition and cured product.

<1>

A room temperature-curable organopolysiloxane composition comprising:

(A) an alkoxysilyl-ethylene group-terminated organopolysiloxane having in one molecule at least one group represented by the following structural formula (1)

[Chemical formula 1]

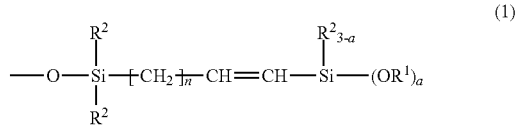
(1)

(wherein $R^1$ represents an alkyl group that has 1 to 20 carbon atoms and may have one or more substituent groups, and the alkyl group having not less than 3 carbon atoms may be a cycloalkyl group as a cyclic group; $R^2$ represents a hydrocarbon group that has 1 to 20 carbon atoms and may have one or more substituent groups; a represents an integer of 1 to 3; and n represents an integer of 0 to 10);

(B) an organopolysiloxane in an amount of 10 to 250 parts by mass with respect to 100 parts by mass of the component (A), and represented by the following general formula (2)

[Chemical formula 2]

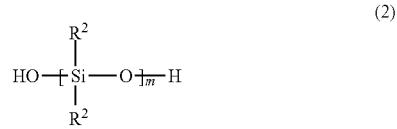
(2)

(wherein $R^2$ represents a hydrocarbon group that has 1 to 20 carbon atoms and may have one or more substituent groups; and m represents a number at which the organopolysiloxane exhibits a viscosity of 10 to 1,000,000 mPa·s at 25° C.); and (C) a curing catalyst in an amount of 0.001 to 20 parts by mass with respect to 100 parts by mass of the component (A).

<2>

The room temperature-curable organopolysiloxane composition according to <1>, wherein the component (A) is a linear organopolysiloxane whose main chain is comprised of repetitive diorganosiloxane units.

<3>

The room temperature-curable organopolysiloxane composition according to <2>, wherein the component (A) is at least one alkoxysilyl-ethylene group-terminated organopolysiloxane selected from the diorganopolysiloxanes represented by the following general formulae (A) and (B)

[Chemical formula 3]

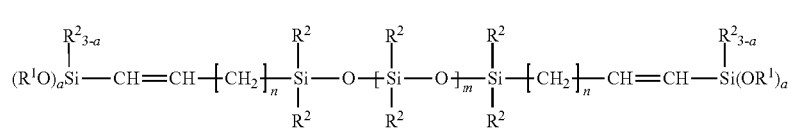
(A)

[Chemical formula 4]

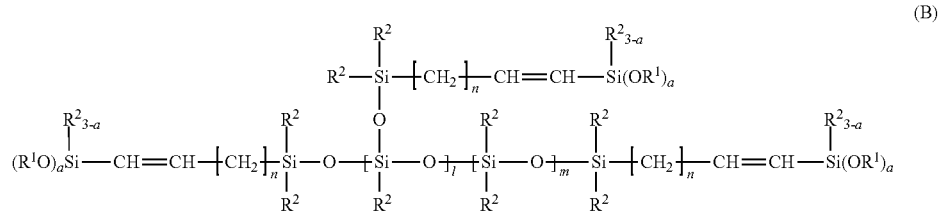
(B)

(wherein $R^1$ represents an alkyl group that has 1 to 20 carbon atoms and may have one or more substituent groups, and the alkyl group having not less than 3 carbon atoms may be a cycloalkyl group; $R^2$ represents a monovalent hydrocarbon group that has 1 to 20 carbon atoms and may have one or more substituent groups; a represents an integer of 1 to 3; n represents an integer of 0 to 10; and each of l and m represents an integer of 0 to 2,000.).

<4>

The room temperature-curable organopolysiloxane composition according to any one of <1> to <3>, further comprising at least one of the following components (D) to (G) in amounts of the following parts by mass with respect to 100 parts by mass of said component (A):

(D) a hydrolyzable silane and/or a partial hydrolysis condensate thereof in an amount of 0.1 to 30 parts by mass;

(E) a filler in an amount of 1 to 1,000 parts by mass;

(F) an adhesion promotor in an amount of 0.1 to 30 parts by mass; and (G) an organopolysiloxane in an amount of 1 to 100 parts by mass and represented by the following structural formula

[Chemical formula 5]

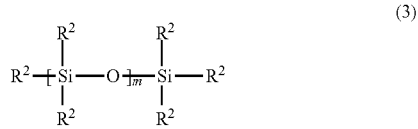

(3)

(wherein $R^2$ represents a hydrocarbon group that has 1 to 20 carbon atoms and may have one or more substituent groups; and m represents an integer of 1 to 2,000.).

<5>

The room temperature-curable organopolysiloxane composition according to <4>, wherein said composition is of a two liquid-type comprising:

an organopolysiloxane composition I containing the components (A) and (C) and if necessary, the component (G) and/or the component (E); and an organosiloxane composition II containing the component (B) and if necessary, the component (D) and/or the component (E).

<6>

The room temperature-curable organopolysiloxane composition according to <5>, wherein the component (F) and/or the component (G) may be added to the organosiloxane composition I and/or the organosiloxane composition II.

<7>

A sealing agent, coating agent or adhesive agent containing the room temperature-curable organopolysiloxane composition as set forth in any one of <1> to <6>.

<8>

A cured product of the room temperature-curable organopolysiloxane composition as set forth in any one of <1> to <6>.

<9>

A molded product comprising the cured product as set forth in <8>.

Effects of the Invention

The room temperature-curable organopolysiloxane composition of the present invention is particularly superior in storage stability and fast curability; and can be rapidly cured to form a cured product such as a silicone rubber with superior physical properties, when exposed to the air even after being stored for, for example, 12 months, particularly 6 months. Further, the composition of the present invention is useful as a sealing agent, a coating agent or an adhesive agent used in locations where heat resistance, water resistance and moisture resistance are required. Especially, the composition of the present invention is useful in construction applications and adhesive agent applications for electric and electronic parts, where steam resistance and water resistance are required.

MODE FOR CARRYING OUT THE INVENTION

The present invention is described in greater detail hereunder.

<Room Temperature-Curable Organopolysiloxane Composition>

—Component (A)—

A component (A) is an alkoxysilyl-ethylene group-terminated organopolysiloxane having in each molecule at least one group (i.e. alkoxysilyl-ethylene group-containing triorganosiloxy group) represented by the following structural formula (1).

[Chemical formula 6]

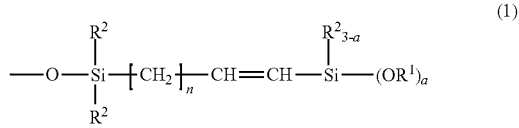

(1)

(In the above formula, $R^1$ represents an alkyl group that has 1 to 20 carbon atoms and may also have a substituent group(s), where such alkyl group having not less than 3 carbon atoms may also be a cycloalkyl group as a cyclic group. $R^2$ represents a hydrocarbon group that has 1 to 20 carbon atoms and may also have a substituent group(s), a represents an integer of 1 to 3. n represents an integer of 0 to 10.)

The alkoxysilyl-ethylene group-terminated organopolysiloxane as the component (A) having in each molecule at least one group represented by the above structural formula (1), is used as a main ingredient (base polymer) of the composition of the present invention. Although the organopolysiloxane as the component (A) may be either linear or branched, it is preferred in general that such organopolysiloxane be a linear diorganopolysiloxane whose main chain is basically composed of a repetitive structure of diorganosiloxane units, and whose molecular chain has both terminals thereof blocked by triorganosiloxy groups. The group represented by the above structural formula (1) (i.e. alkoxysilyl-ethylene group-containing triorganosiloxy group) may be located either at the terminal(s) of the molecular chain of the organopolysiloxane as the component (A) or at a non-terminal location(s) on such molecular chain (i.e. in the midway of the molecular chain), or even at both of these kinds of locations. However, it is desired from the perspective of fast curability that, at the minimum, one such group be individually present at each of the terminals of the molecular chain of the organopolysiloxane as the component (A) (i.e. at least two such groups in a molecule). Accordingly, it is desired that the organopolysiloxane as the component (A) be a linear diorganopolysiloxane having one such group represented by the structural formula (1) at each of the terminals of the molecular chain at the minimum. Particularly, it is desired that the organopolysiloxane as the component (A) be a linear diorganopolysiloxane only having one such group represented by the structural formula (1) at each of the terminals of the molecular chain (i.e. only two such groups in total at both terminals of the molecular chain).

More particularly, a diorganopolysiloxane(s) represented by the following general formula (A) and/or general formula (B) are listed as preferable examples.

[Chemical formula 7]

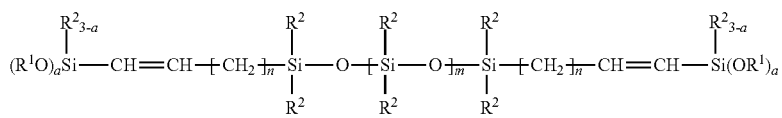
(A)

[Chemical formula 8]

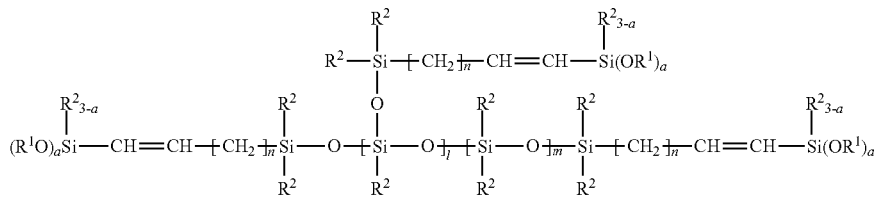
(B)

(In the above formulae, $R^1$ represents an alkyl group (substituted or unsubstituted alkyl group) that has 1 to 20, preferably 1 to 10, more preferably 1 to 4 carbon atoms, and may also have a substituent group(s), where such alkyl group having not less than 3 carbon atoms may also be a cycloalkyl group as a cyclic group. $R^2$ represents a monovalent hydrocarbon group (substituted or unsubstituted monovalent hydrocarbon group) that has 1 to 20, preferably 1 to 8 carbon atoms and may also have a substituent group(s). a represents an integer of 1 to 3, preferably 2 or 3, more preferably 3. n represents an integer of 0 to 10, preferably 0 to 6, more preferably 0 to 2, even more preferably 0. Each of l and m represents an integer of 0 to 2,000. It is preferred that l be an integer of 0 to 20, and that m be an integer of 10 to 2,000. It is more preferred that l be an integer of 0 to 10, and that m be an integer of 40 to 1,500. And, it is even more preferred that l be 0, and that m be an integer of 100 to 1,000.)

In the above formulae (1), (A) and (B), examples of the alkyl group as $R^1$ that has 1 to 20 carbon atoms and may also have a substituent group(s) include an alkyl group such as a methyl group, an ethyl group, a propyl group, an isopropyl group, a butyl group, an isobutyl group, a tert-butyl group, a pentyl group, an hexyl group, a heptyl group, an octyl group, a 2-ethylhexyl group, a nonyl group, a decyl group and an octadecyl group; a cycloalkyl group such as a cyclopentyl group and a cyclohexyl group; an aralkyl group such as a benzyl group, a 2-phenylethyl group and a 3-phenylpropyl group; or a group obtained by substituting a part of or all the hydrogen atoms of any of the aforementioned groups with, for example, halogen atoms such as F, Cl and Br, cyano groups and alkoxy groups, examples of such group being a 3-chloropropyl group, a 3,3,3-trifluoropropyl group, a 2-cyanoethyl group, a methoxyethyl group, an ethoxyethyl group and a methoxypropyl group. Even in these examples, a methyl group and an ethyl group are preferred. In the meantime, a methyl group is particularly preferred in terms of availability, productivity and cost.

Examples of the hydrolyzable group OR' (alkoxy group) at the terminal as shown in the formula (1), include an alkoxy group such as a methoxy group, an ethoxy group, a propoxy group, an isopropoxy group, a butoxy group, an isobutoxy group, a tert-butoxy group and a 2-ethylhexoxy group; and an alkoxyalkoxy group such as a methoxyethoxy group, an ethoxyethoxy group and a methoxypropoxy group. Even in these examples, a methoxy group and an ethoxy group are particularly preferred due to their fast curing properties.

Examples of the substituted or unsubstituted monovalent hydrocarbon group as $R^2$ include an alkyl group such as a methyl group, an ethyl group, a propyl group, an isopropyl group, a butyl group, an isobutyl group, a tert-butyl group, a pentyl group, a hexyl group, a heptyl group, an octyl group, a 2-ethylhexyl group, a nonyl group, a decyl group and an octadecyl group; a cycloalkyl group such as a cyclopentyl group and a cyclohexyl group; an alkenyl group such as a vinyl group, an allyl group, a butenyl group, a pentenyl group and a hexenyl group; an aryl group such as a phenyl group, a tolyl group, a xylyl group and an α-, β-naphthyl group; an aralkyl group such as a benzyl group, a 2-phenylethyl group and a 3-phenylpropyl group; or a group obtained by substituting a part of or all the hydrogen atoms of any of the aforementioned groups with, for example, halogen atoms such as F, Cl and Br and cyano groups, examples of such group being a 3-chloropropyl group, a 3,3,3-trifluoropropyl group and a 2-cyanoethyl group. Even in these examples, a methyl group and an ethyl group are preferred. In the meantime, a methyl group is particularly preferred in terms of availability, productivity and cost.

It is preferred that the diorganopolysiloxane as the component (A) be that exhibiting a viscosity of 10 to 1,000,000 mPa·s, more preferably 50 to 500,000 mPa·s, even more preferably 100 to 100,000 mPa·s, especially preferably 1,000 to 80,000 mPa·s, at a temperature of 25° C. It is preferable when such viscosity of the above diorganopolysiloxane is not lower than 10 mPa·s, because there can be easily obtained a coating film superior in physical and mechanical strengths. It is also preferable when such viscosity is not higher than 1,000,000 mPa·s, because a viscosity of the composition will not become excessively high such that a favorable workability can be achieved at the time of use. Here, the viscosity refers to a value measured by a rotary viscometer (e.g. BL-type, BH-type, BS-type, cone plate-type and rheometer-type, same as below). In order to obtain a diorganopolysiloxane exhibiting the above viscosities, the amount of an ethynyl group-containing disiloxane added is to be adjusted, for example. That is, when producing a diorganopolysiloxane having an ethynyl group at both terminals through a polymerization of a disiloxane having an ethynyl group at both terminals and an octamethylcyclotetrasiloxane, the viscosity can be reduced by increasing the amount of such ethynyl group-containing disiloxane added, or increased by reducing the amount of the ethynyl group-containing disiloxane added.

The diorganopolysiloxane as the component (A) may, for example, be produced by first producing a diorganopolysiloxane having an ethynyl group at both terminals through a polymerization reaction between a disiloxane having an acetylene group at both terminals and an octamethylcyclotetrasiloxane under a sulfuric acid catalyst; and then by adding trialkoxysilane thereto.

While examples of an addition reaction catalyst used to add trialkoxysilane include a platinum group metal-based catalyst such as a platinum-based catalyst; a palladium-based catalyst; and a rhodium-based catalyst, a platinum-based catalyst is particularly favorable. Examples of such platinum-based catalyst include platinum black; a catalyst with a solid platinum being supported on a support such as alumina and silica; a chloroplatinic acid; an alcohol-modified chloroplatinic acid; a complex of a chloroplatinic acid and olefin; or a complex of platinum and vinylsiloxane. As for an amount of such catalyst used, a so-called catalytic amount will suffice. For example, the catalyst is to be used in an amount of 0.1 to 1,000 ppm, particularly 0.5 to 100 ppm, in terms of a platinum-group metal with respect to trialkoxysilanes.

It is desired that this reaction be performed at a temperature of 50 to 120° C. in general, particularly at a temperature of 60 to 100° C., for 0.5 to 12 hours, particularly for 1 to 6 hours. Further, although such reaction can be performed without using a solvent, an appropriate solvent such as toluene and xylene may be used so long as the above addition reaction as well as other reactions will not be adversely affected.

In an addition reaction to an acetylene group(s), a geometric isomer represented by the following formula (4) is formed. Here, trans-isomers are richly formed, and exhibit high reactivities. However, as for the diorganopolysiloxane of the present invention, since the properties thereof will not be adversely impacted, trans-isomers and cis-isomers need not be separated from each other before use.

[Chemical formula 9]

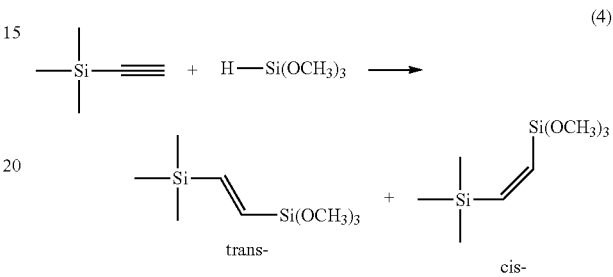

(4)

Following are specific examples of the diorganopolysiloxane as the component (A).

[Chemical formula 10]

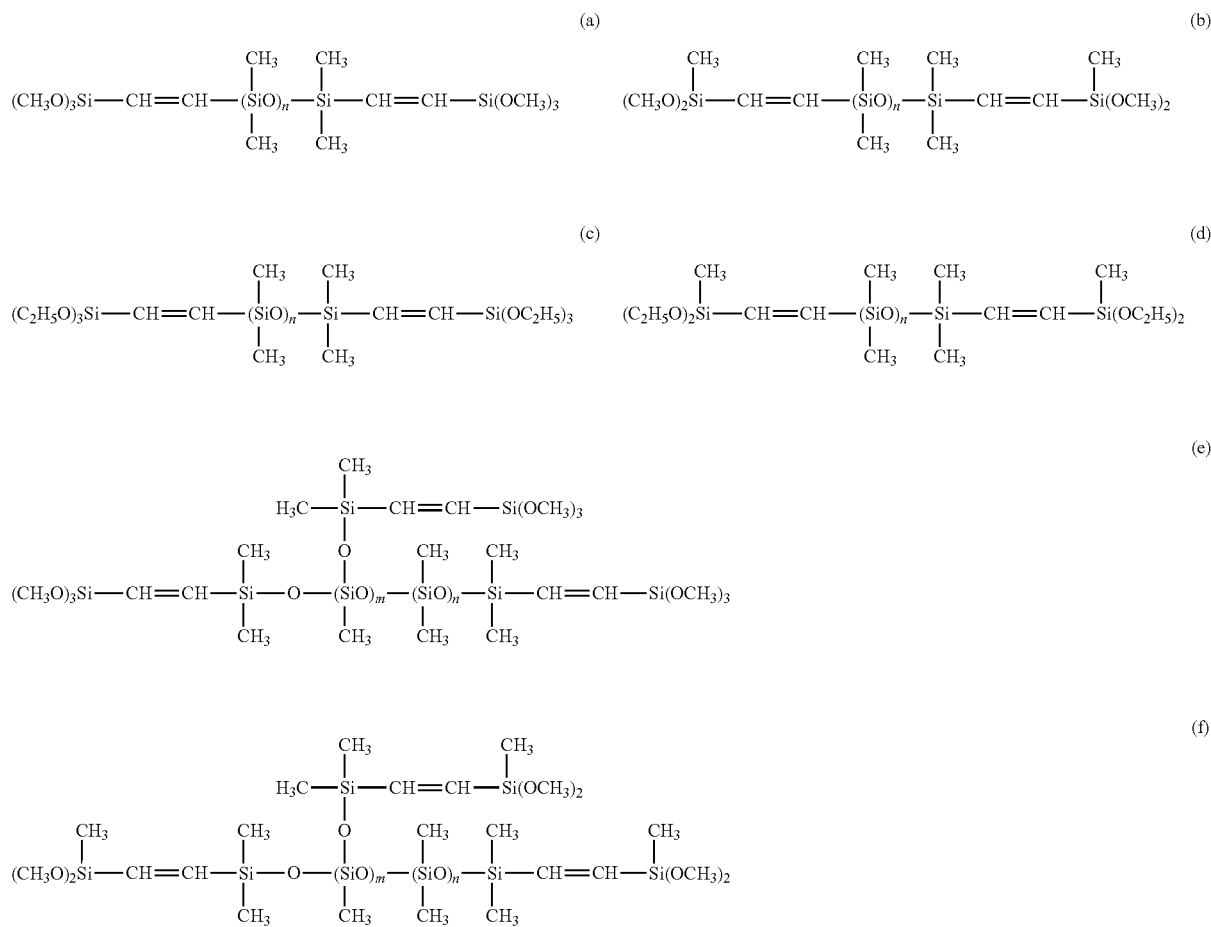

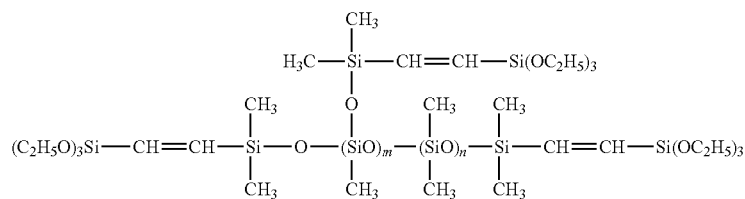

(g)

(In the formulae, each of m and n represents what each of m and n represents in formula (A) or formula (B).)

Only one kind of such diorganopolysiloxane as the component (A) may be used; or two or more kinds of such diorganopolysiloxane as the component (A) differing in structure and molecular weight may be used in combination.

—Component (B)—

An organopolysiloxane as a component (B) is a linear diorganopolysiloxane represented by the following structural formula (2), where both terminals of its molecular chain are blocked by silanol groups (hydroxyl groups bonded to silicon atoms). The component (B) serves a main ingredient (base polymer) of the composition of the present invention when used in combination with the organopolysiloxane as the component (A) at a given ratio.

[Chemical formula 11]

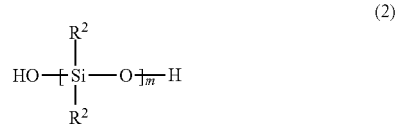

(2)

(In the formula, $R^2$ represents a monovalent hydrocarbon group (unsubstituted or substituted monovalent hydrocarbon group) that has 1 to 20, preferably 1 to 8 carbon atoms and may have one or more substituent groups. m represents a number at which the organopolysiloxane exhibits a viscosity of 10 to 1,000,000 mPa·s at 25° C. In general, m represents an integer of 2 to 2,000, preferably an integer of 10 to 2,000, more preferably an integer of 40 to 1,500, or even more preferably an integer of about 100 to 1,000.)

In the above formula (2), examples of the substituted or unsubstituted monovalent hydrocarbon group as $R^2$ include an alkyl group such as a methyl group, an ethyl group, a propyl group, an isopropyl group, a butyl group, an isobutyl group, a tert-butyl group, a pentyl group, a hexyl group, a heptyl group, an octyl group, a 2-ethylhexyl group, a nonyl group, a decyl group and an octadecyl group; a cycloalkyl group such as a cyclopentyl group and a cyclohexyl group; an alkenyl group such as a vinyl group, an allyl group, a butenyl group, a pentenyl group and a hexenyl group; an aryl group such as a phenyl group, a tolyl group, a xylyl group and an α-, β-naphthyl group; an aralkyl group such as a benzyl group, a 2-phenylethyl group and a 3-phenylpropyl group; or a group obtained by substituting a part of or all the hydrogen atoms of any of the aforementioned groups with, for example, halogen atoms such as F, Cl and Br and cyano groups, examples of such group being a 3-chloropropyl group, a 3,3,3-trifluoropropyl group and a 2-cyanoethyl group. Even in these examples, a methyl group and an ethyl group are preferred. In the meantime, a methyl group is particularly preferred in terms of availability, productivity and cost.

Further, it is preferred that the organopolysiloxane as the component (B) be that exhibiting a viscosity of 10 to 1,000,000 mPa·s, more preferably 50 to 500,000 mPa·s, even more preferably 100 to 100,000 mPa·s, especially preferably 100 to 80,000 mPa·s, at a temperature of 25° C. It is preferable when such viscosity of the above diorganopolysiloxane is not lower than 10 mPa·s, because there can be easily obtained a coating film superior in physical and mechanical strengths. It is also preferable when such viscosity is not higher than 1,000,000 mPa·s, because a viscosity of the composition will not become excessively high such that a favorable workability can be achieved at the time of use. Here, the viscosity refers to a value measured by a rotary viscometer.

The component (B) is added in an amount of 10 to 250 parts by mass, preferably 15 to 150 parts by mass with respect to 100 parts by mass of the component (A). A satisfactory curability may not be achieved if such amount of the component (B) is greater than 250 parts by mass. Also, it is preferred that the component (B) be prepared as a composition different from the component (A), and that a multicomponent composition composed of not less than two kinds (two liquids) of such components be uniformly mixed at the time of use.

—Component (C)—

A component (C) is a curing catalyst, and is used to cure the composition. Examples of such curing catalyst include organometallic compounds; phosphazene-containing compounds; aminoalkyl group-substituted alkoxysilanes; amine compounds or their salts; quaternary ammonium salts; lower fatty acid salts of alkali metals; dialkylhydroxylamine; and silanes and siloxanes containing guanidyl groups. Specifically, examples of such organometallic compounds include alkyl tin ester compounds such as dibutyl tin diacetate, dibutyl tin dilaurate, dioctyl tin dilaurate and dibutyl tin dioctoate; titanate ester or titanium chelate compounds such as tetra (isopropoxy) titanium, tetra n-butoxy titanium, tetrakis (2-ethylhexoxy) titanium, dipropoxybis (acetylacetonato) titanium and titanium isopropoxyoctylene glycol; zinc naphthenate; zinc stearate; zinc-2-ethyloctoate; iron-2-ethylhexoate; cobalt-2-ethylhexoate; manganese-2-ethylhexoate; cobalt naphthenate; alcoholate aluminum compounds such as aluminum isopropylate and aluminum secondary butylate; aluminum chelate compounds such as aluminum alkylacetate.diisopropylate and aluminum bis-ethylacetoacetate.mono acetylacetonate; bismuth neodecanoate (III); bismuth 2-ethylhexanoate (III); bismuth citrate (III); and bismuth octylate. Examples of the above aminoalkyl group-substituted alkoxysilanes include 3-aminopropyltriethoxysilane and N-β (aminoethyl) γ-aminopropyltrimethoxysilane; examples of the above amine compounds include hexylamine and dodecylamine phosphate; examples of the above quaternary ammonium salts include benzyltriethylammonium acetate; examples of the above alkali metals include potassium acetate, sodium acetate and lithium oxalate; examples of the above dialkylhydroxylamine include dimethylhydroxylamine and diethylhydroxylamine; and examples of the above silanes and siloxanes containing guanidyl groups include tetramethylguanidylpropyltrimethoxysilane, tetramethyl guanidylpropylmethyldimethoxysilane and tetramethylguanidyipropyltris (trimethylsiloxy) silane. However, the component (C) is not limited to the above examples. Also, as such component (C), there may be used one kind of them, or two or more kinds of them by mixture.

Here, it is preferred that the component (C) be added in an amount of 0.001 to 20 parts by mass, particularly 0.005 to 10 parts by mass with respect to 100 parts by mass of the component (A).

The following component(s) may also be added to the composition of the present invention as optional ingredients if necessary.

—Component (D)—

A hydrolyzable silane and/or a partial hydrolysis condensate thereof as a component (D), serves as a cross-linking agent. In general, examples of such hydrolyzable silane include trifunctional or tetrafunctional organoxysilanes such as tetraalkoxysilanes, alkyltrialkoxysilane, alkyltri (alkoxy-substituted alkoxy) silane and alkyltrialkenyloxysilane.

Specific examples of such component (D) include ethylsilicate, propylsilicate, tetraethoxysilane, tetrapropoxysilane, methyltrimethoxysilane, methyltriethoxysilane, ethyltrimethoxysilane, ethyltriethoxysilane, methyltris (methoxyethoxy) silane, ethyltris (methoxyethoxy) silane, methyltripropenoxysilane, ethyltripropenoxysilane and their partial hydrolysis condensates. Either one of these ingredients may be used singularly, or two or more of them may be used in combination.

If adding the component (D), it is generally added in an amount of 0.1 to 30 parts by mass, preferably 0.2 to 20 parts by mass, more preferably 0.5 to 15 parts by mass with respect to 100 parts by mass of the component (A). If such amount of the component (D) added is greater than 30 parts by mass, there may occur a problem where a cured product may become excessively hard, and where an economically disadvantaged condition(s) may be triggered.

From the perspective of storage stability, it is preferred that the room temperature-curable organopolysiloxane composition of the present invention be preserved as two separate compositions of the above components (A) to (D) (i.e. two-liquid type). In such case, it is preferred that each of the components (A) and (B) be separately added to different compositions. For example, it is preferred that there be prepared an organopolysiloxane composition I by previously mixing the components (A) and (C); and an organosiloxane composition II by previously mixing the component (B) and the component (D) if necessary. Later, it is preferred that the room temperature-curable organosiloxane composition be obtained by mixing such organopolysiloxane composition I and organosiloxane composition II immediately before actual use. Here, as long as the components (A) and (B) are separated from each other, other components may also be arbitrarily added thereto.

In addition, the two liquids can also be an organopolysiloxane composition III prepared by previously mixing the components (A) and (D); and an organopolysiloxane composition IV prepared by previously mixing the components (B) and (C). However, since the organopolysiloxane composition IV may exhibit an increased viscosity when preserved for a long period of time, it is preferred that the two liquids be the above compositions I and II.

Here, as long as the components (A) and (B) are separated from each other, other components may also be arbitrarily added thereto.

Further, one or not less than two of the following components (E), (F) and (G) may be arbitrarily added to one or not less than two of the organosiloxane compositions I to IV.

—Component (E)—

A component (E) is a filler (inorganic filler and/or organic resin filler), and is used to impart a sufficient mechanical strength to a cured product formed of the composition of the present invention. A known material can be used as such filler, and examples thereof include a silica fine powder, a fumed silica, a precipitated silica and silicas obtained by performing a hydrophobic treatment on the surfaces of these silicas with an organic silicon compound; glass beads; a glass balloon; transparent resin beads; a silica aerogel; a diatomaceous earth; metal oxides such as an iron oxide, a zinc oxide, a titanium oxide and a fumed metal oxide; wet silicas or those surface-treated with silane; reinforcement materials such as a quartz powder, carbon black, talc, zeolite and bentonite; asbestos; glass fibers; carbon fibers; metal carbonates such as calcium carbonate, magnesium carbonate and zinc carbonate; asbestos; a glass wool; a finely powdered mica; a molten silica powder; and synthetic resin powders such as polystyrene, polyvinyl chloride and polypropylene. Among these fillers, silica, calcium carbonate, zeolite and the like are preferred. Particularly preferred are a fumed silica whose surface has been subjected to a hydrophobic treatment; and calcium carbonate.

If adding the component (E), it is preferred that the component be added in an amount of 1 to 1,000 parts by mass, particularly 1 to 400 parts by mass with respect to 100 parts by mass of the component (A). If such amount of the component (E) is larger than 1,000 parts by mass, not only the viscosity of the composition will increase such that an unfavorable workability will be exhibited, but a rubber strength after curing will decrease such that it will be difficult to achieve a rubber elasticity. When the component (E) is added in an amount of not smaller than 1 part by mass, the mechanical strength of the cured product obtained can be sufficiently improved.

—Component (F)—

A component (F) is an adhesion promotor, and is used to impart a sufficient adhesiveness to the cured product formed of the composition of the present invention. A known material can be favorably used as the adhesion promotor (e.g. a silane coupling agent such as an alkoxysilane having a functional group-containing monovalent hydrocarbon group(s) (so-called carbon-functional silane)). Examples of such adhesion promotor include a vinyl silane coupling agent, a (metha) acrylic silane coupling agent, an epoxy silane coupling agent, an amino silane coupling agent and a mercapto silane coupling agent. Specific examples of the abovementioned adhesion promotor include alkenyl triorganoxysilanes such as vinyltrimethoxysilane, vinyltriethoxysilane, vinyltripropenoxysilane and vinyltris(β-methoxyethoxy) silane; γ-methacryloxy-propyltrimethoxysilane, β-(3,4-epoxycyclohexyl) ethyltrimethoxysilane, γ-glycidoxypropyltrimethoxysilane, γ-glycidoxypropylmethyldiethoxysilane, N-β-(aminoethyl) γ-aminopropyltrimethoxysilane, γ-aminopropyltriethoxysilane, 3-2-(aminoethylamino) propyltrimethoxysilane, γ-mercaptopropyltrimethoxysilane and isocyanate silane.

Particularly preferred are, for example, aminosilanes such as γ-aminopropyltriethoxysilane and 3-2-(aminoethylamino) propyltrimethoxysilane; γ-glycidoxypropyltrimethoxysilane; epoxysilanes such as 13-(3,4-epoxycyclohexyl) ethyl-trimethoxysilane; and isocyanate silane.

If adding the component (F), it is preferred that it be added in an amount of 0.1 to 30 parts by mass, particularly 0.1 to 20 parts by mass with respect to 100 parts by mass of the component (A). There is no need to use a silane coupling agent if adhesion can already be effected due to a filler and an adherend without using an adhesion promotor. In such case, a disadvantageous condition in pricing will occur if the component (F) is added in an amount of greater than 10 parts by mass.

—Component (G)—

An organopolysiloxane as a component (G) is a so-called nonfunctional linear diorganopolysiloxane (silicone oil component) represented by the following general formula (3). That is, the organopolysiloxane as the component (G) does not have a functional group(s) in its molecules that are associated with hydrolytic condensation and cross-linking (curing) reactions as are the cases with the components (A) and (B). The component (G) serves as a diluent of the composition of the present invention, if necessary.

[Chemical formula 12]

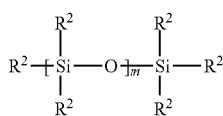

(3)

(In the above formula, $R^2$ represents a monovalent hydrocarbon group (substituted or unsubstituted monovalent hydrocarbon group) that may have one or more substituent groups and has 1 to 20, preferably 1 to 8 carbon atoms. m represents an integer of 1 to 2,000, preferably an integer of 10 to 2,000, more preferably an integer of 40 to 1,500, or even more preferably an integer of about 100 to 1,000.

In the above formula (3), examples of the substituted or unsubstituted monovalent hydrocarbon group as $R^2$ include an alkyl group such as a methyl group, an ethyl group, a propyl group, an isopropyl group, a butyl group, an isobutyl group, a tert-butyl group, a pentyl group, a hexyl group, a heptyl group, an octyl group, a 2-ethylhexyl group, a nonyl group, a decyl group and an octadecyl group; a cycloalkyl group such as a cyclopentyl group and a cyclohexyl group; an alkenyl group such as a vinyl group, an allyl group, a butenyl group, a pentenyl group and a hexenyl group; an aryl group such as a phenyl group, a tolyl group, a xylyl group and an α-, β-naphthyl group; an aralkyl group such as a benzyl group, a 2-phenylethyl group and a 3-phenylpropyl group; or a group obtained by substituting a part of or all the hydrogen atoms of any of the aforementioned groups with, for example, halogen atoms such as F, Cl and Br and cyano groups, examples of such group being a 3-chloropropyl group, a 3,3,3-trifluoropropyl group and a 2-cyanoethyl group. Even in these examples, a methyl group and an ethyl group are preferred. In the meantime, a methyl group is particularly preferred in terms of availability, productivity and cost.

Further, it is preferred that the organopolysiloxane as the component (G) be that exhibiting a viscosity of 0.65 to 1,000,000 mPa·s, more preferably 30 to 500,000 mPa·s, even more preferably 50 to 100,000 mPa·s, especially preferably 100 to 80,000 mPa·s, at a temperature of 25° C. It is preferable when such viscosity of the above diorganopolysiloxane is not lower than 10 mPa·s, because there can be easily obtained a coating film superior in physical and mechanical strengths. It is also preferable when such viscosity is not higher than 1,000,000 mPa·s, because a viscosity of the composition will not become excessively high such that a favorable workability can be achieved at the time of use. Here, the viscosity refers to a value measured by a rotary viscometer.

If adding the component (G), it is preferred that it be added in an amount of 1 to 100 parts by mass, more preferably 5 to 70 parts by mass, and even more preferably 10 to 60 parts by mass with respect to 100 parts by mass of the component (A). However, there is no need to add the component (G) if the viscosity of the composition is low and a sufficient workability can already be achieved. Also, rubber physical properties may be impaired if the component (G) is added in an amount of 100 parts by mass.

—Other Components—

Further, a known additive agent(s) as an optional additive agent(s) may also be added to the room temperature-curable organopolysiloxane composition of the present invention. Examples of such additive agent include a pigment; a dye; an anti-degradation agent; an antioxidant; an antistat; and a flame retardant such as antimony oxide and chlorinated paraffin. In addition, polyether as a thixotropy improver, a fungicide and an antibacterial agent may also be added to the composition of the present invention.

Moreover, the room temperature-curable organopolysiloxane composition of the present invention can be obtained by homogenously mixing each of the above components and the various additive agents of a given amount under a dry atmosphere.

Here, although the room temperature-curable organopolysiloxane composition can be cured when left under a room temperature, there can be employed a known method and a known condition as a molding method and a curing condition for the composition of the invention in accordance with the particular type of the composition.

The room temperature-curable organopolysiloxane composition thus obtained in the present invention rapidly cures under a room temperature due to the moisture in the air, and thus forms a rubber elastic body cured product superior in heat resistance, water resistance, moisture resistance, weather resistance, low-temperature property and adhesion to various kinds of base materials such as metal base materials in particular. Further, the composition of the present invention is especially superior in storage stability and curability in a way such that the composition can still be rapidly cured and form a cured product with the above excellent properties when exposed to the air even after being stored for, for example, 12 months, particularly 6 months. Furthermore, there will be no toxic or corrosive gas emitted at the time of curing, and no rust will occur on a surface to which the composition of the invention has been applied. Moreover, since the composition of the invention does not cause contact faults associated with electrical and electronic parts, the composition is not only useful as an insulation material and an adhesive agent for use in electrical and electronic parts, but can also be widely used as a sealing agent, a coating agent, a covering agent and a mold release treating agent for use in various kinds of base materials or as a textile treating agent. In addition, various molded products can be obtained by curing and molding the composition of the invention, and these molded products are superior in properties such as heat resistance, water resistance, moisture resistance and weather resistance.

Working Example

The present invention is described in detail hereunder with reference to synthesis examples, working examples and comparative examples. However, the present invention is not limited to the following working examples. In the following specific examples, "part" refers to "part by mass," and Me represents a methyl group. Further, a viscosity refers to a value measured by a rotary viscometer at 25° C.

Synthesis Example

Following is a method for synthesizing the dimethylpolysiloxane compound whose both terminals are blocked by trimethoxysilyl-ethylene groups, as employed in the working examples.

<Synthesis of Dimethylpolysiloxane Compound Containing Ethynyl Groups at Both Terminals>

Octamethylcyclotetrasiloxane of 3,050 g, 1,3-diethynyl-1,1,3,3-tetramethyldisiloxane of 32 g and a concentrated sulfuric acid ($H_2SO_4$) of 154 g were put into a 5,000 mL four-necked separable flask equipped with a mechanical stirrer, a thermometer and a dropping funnel, followed by stirring these ingredients under a room temperature (23° C.) for not less than 3 hours. Later, water ($H_2O$) of 66 g was added to the four-necked flask to perform stirring for not less than an hour. Toluene of 500 mL was further added thereto, and a toluene solution that had remained after performing separation of waste acid was then washed by water until such toluene solution had become neutral. The following polymer A exhibiting a viscosity of 935 mPa·s was then obtained by stripping toluene and low molecular siloxane under a reduced pressure-condition of 150° C./8 mmHg.

[Chemical formula 13]

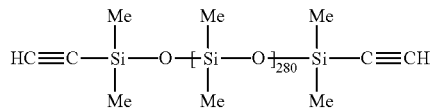

<Synthesis of Dimethylpolysiloxane Compound with Both Terminals Blocked by Trimethoxysilyl-Ethylene Groups>

The polymer A of 1,000 g, trimethoxysilane of 6.4 g and a chloroplatinic acid ($H_2PtCl_6 \cdot 6H_2O$) of 0.5 g were put into a 5,000 mL four-necked separable flask equipped with a mechanical stirrer, a thermometer and a dropping funnel, followed by stirring these ingredients at 70° C. for 3 hours. Later, the following polymer B exhibiting a viscosity of 970 mPa·s was obtained by performing stripping under a reduced pressure-condition of 120° C./20 mmHg.

[Chemical formula 14]

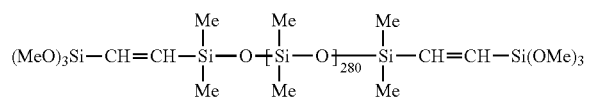

Working Example 1

As a first component, a composition I was obtained by mixing the polymer B of 100 parts by mass and dioctyltindilaurate of 0.5 parts under a reduced pressure until uniformly mixed. As a second component, a composition II were 100 parts by mass of a linear dimethylpolysiloxane whose molecular chain terminals are both blocked by hydroxyl groups (viscosity 5,000 mPa·s at 25° C.). A room temperature-curable organopolysiloxane composition 1 was then prepared by mixing the compositions I and II under an environment where moisture was blocked.

Working Example 2

As a first component, a composition I was obtained by mixing the polymer B of 100 parts by mass and tetramethylguanidylpropyltrimethoxysilane of 0.25 parts under a reduced pressure until uniformly mixed. As a second component, a composition II were 100 parts by mass of a linear dimethylpolysiloxane whose molecular chain terminals are both blocked by hydroxyl groups (viscosity 5,000 mPa·s at 25° C.). A room temperature-curable organopolysiloxane composition 2 was then prepared by mixing the compositions I and II under an environment where moisture was blocked.

Working Example 3

As a first component, a composition I was obtained by mixing the polymer B of 100 parts by mass and bismuth neodecanoate (III) of 0.51 parts under a reduced pressure until uniformly mixed. As a second component, a composition II were 100 parts by mass of a linear dimethylpolysiloxane whose molecular chain terminals are both blocked by hydroxyl groups (viscosity 5,000 mPa·s at 25° C.). A room temperature-curable organopolysiloxane composition 3 was then prepared by mixing the compositions I and II under an environment where moisture was blocked.

Comparative Examples 1 to 3

A composition was prepared in the similar manner as the working examples 1 to 3, except that 100 parts of a linear dimethylpolysiloxane whose molecular chain terminals are blocked by trimethoxysilyl-ethane residues (viscosity 1,000 mPa·s) were used as the first component instead of the linear dimethylpolysiloxane whose molecular chain terminals are both blocked by trimethoxysilyl-ethylene groups (polymer B).

Comparative Examples 4 to 6

A composition was prepared in the similar manner as the working examples 1 to 3, except that 100 parts of a linear dimethylpolysiloxane whose molecular chain terminals are blocked by trimethoxysiloxy groups (viscosity 1,000 mPa·s) were used as the first component instead of the linear dimethylpolysiloxane whose molecular chain terminals are both blocked by trimethoxysilyl-ethylene groups (polymer B).

Later, a tack-free time of each of the compositions prepared in the working examples 1 to 3 and the comparative examples 1 to 6 was measured.

Further, each of the compositions prepared in the working examples 1 to 3 and the comparative examples 1 to 6 was pushed out as a sheet-shaped sample of a thickness of 2 mm, immediately after the composition had been prepared. The sheet-shaped sample was then exposed to an air of 23±2° C., 50±5% RH (relative humidity), and the physical properties (initial physical properties) of a cured product obtained by leaving such sheet under the same atmosphere for 3 days were measured in accordance with JIS K-6249. Here, a hardness of the cured product was measured with a durometer A hardness scale in accordance with JIS K-6249.

Furthermore, similar measurements were performed on such cured product that had been stored in a thermo-hygrostat of 85° C., 85% RH for seven days. Moreover, similar measurements were also performed on such cured product that had been heated in an oven of 150° C. for 10 days. In addition, each of the compositions prepared in the working examples 1 to 3 and the comparative examples 1 to 6 was placed in a sealed container immediately after the composition had been prepared. The composition was then left at 70° C. for 7 days, and a sheet of a thickness of 2 mm was later formed of such composition that had been left at 70° C. for 7 days. Similar measurements were then performed on a cured product obtained by leaving such sheet of 2 mm in the air of 23±2° C., 50±5% RH (relative humidity) for 3 days.

These results are shown in Tables 1, 2 and 3.

TABLE 1

| Measurement result | | Working example 1 | Working example 2 | Working example 3 |
|---|---|---|---|---|
| Tack-free time (min) | | 6 | 25 | 55 |
| Initial RTV 3 days | Hardness (Durometer A) | 23 | 26 | 29 |
| | Elongation (%) | 85 | 50 | 85 |
| | Tensile strength (MPa) | 0.33 | 0.26 | 0.48 |
| Heat resistance 150° C. 10 days | Hardness (Durometer A) | 22 | 28 | 24 |
| | Elongation (%) | 85 | 50 | 40 |
| | Tensile strength (MPa) | 0.32 | 0.25 | 0.21 |
| Moisture resistance 85° C./ 85% RH 7 days | Hardness (Durometer A) | 24 | 25 | 27 |
| | Elongation (%) | 90 | 75 | 80 |
| | Tensile strength (MPa) | 0.35 | 0.31 | 0.39 |
| Storage 70° C., 7 days RTV | Hardness (Durometer A) | 22 | 25 | 28 |
| | Elongation (%) | 85 | 55 | 55 |
| | Tensile strength (MPa) | 0.33 | 0.28 | 0.36 |

TABLE 2

| Measurement result | | Comparative example 1 | Comparative example 2 | Comparative example 3 |
|---|---|---|---|---|
| Tack-free time (min) | | 120< | 120< | 120< |
| Initial RTV 3 days | Hardness (Durometer A) (C: ASKER) | 16 | 12(C) | 15 |
| | Elongation (%) | 135 | 220 | 150 |
| | Tensile strength (MPa) | 0.28 | 0.07 | 0.39 |
| Heat resistance 150° C. 10 days | Hardness (Durometer A) (C: ASKER) | 22 | 54(C) | 23 |
| | Elongation (%) | 115 | 75 | 35 |
| | Tensile strength (MPa) | 0.31 | 0.11 | 0.33 |
| Moisture resistance 85° C./ 85% RH 7 days | Hardness (Durometer A) | 18 | 9 | 17 |
| | Elongation (%) | 95 | 65 | 85 |
| | Tensile strength (MPa) | 0.26 | 0.13 | 0.26 |
| Storage 70° C., 7 days RTV | Hardness (Durometer A) (C: ASKER) | 12 | 15(C) | Unmeasurable |
| | Elongation (%) | 165 | 220 | |
| | Tensile strength (MPa) | 0.24 | 0.06 | |

TABLE 3

| Measurement result | | Comparative example 4 | Comparative example 5 | Comparative example 6 |
|---|---|---|---|---|
| Tack-free time (min) | | 120< | 120< | 120 |
| Initial RTV 3 days | Hardness (Durometer A) | 21 | 19 | 15 |
| | Elongation (%) | 100 | 95 | 125 |
| | Tensile strength (MPa) | 0.30 | 0.29 | 0.28 |
| Heat resistance 150° C. 10 days | Hardness (Durometer A) | 20 | 21 | 20 |
| | Elongation (%) | 85 | 75 | 80 |
| | Tensile strength (MPa) | 0.25 | 0.25 | 0.21 |
| Moisture resistance 85° C./ 85% RH 7 days | Hardness (Durometer A) | 15 | 8 | 9 |
| | Elongation (%) | 85 | 110 | 100 |
| | Tensile strength (MPa) | 0.21 | 0.16 | 0.18 |
| Storage 70° C., 7 days RTV | Hardness (Durometer A) | 20 | 19 | 12 |
| | Elongation (%) | 110 | 85 | 145 |
| | Tensile strength (MPa) | 0.28 | 0.29 | 0.26 |

Working Example 4

As a first component, a composition I was obtained by mixing 100 parts by mass of the polymer B; 13 parts of a filler (fumed silica whose surface had been subjected to a hydrophobic treatment by dimethylchlorosilane); 5 parts of a linear dimethylpolysiloxane whose viscosity is 100 mPa·s and whose molecular chain terminals are both blocked by trimethylsiloxy groups; and 1 part of tetramethylguanidylpropyltrimethoxysilane, under a reduced pressure until uniformly mixed. As a second component, a composition II was obtained by mixing 100 parts by mass of a linear dimethylpolysiloxane whose molecular chain terminals are both blocked by hydroxyl groups (viscosity 5,000 mPa·s at 25° C.); 5 parts of vinyltrimethoxysilane; 0.8 parts of 3-aminopropyltriethoxysilane; and 0.8 parts of N-2-(aminoethyl)-3-aminopropyltrimethoxysilane. A room temperature-curable organopolysiloxane composition 4 was then prepared by mixing the compositions I and II under an environment where moisture was blocked.

Comparative Example 7

A composition 7 was prepared in the similar manner as the working example 4, except that 100 parts of a linear dimethylpolysiloxane whose molecular chain terminals are both blocked by trimethoxysilyl-ethane groups were used instead of the polymer B.

Comparative Example 8

A composition 8 was prepared in the similar manner as the working example 4, except that 100 parts of a linear dimethylpolysiloxane whose molecular chain terminals are both blocked by trimethoxysiloxy groups were used instead of the polymer B.

Further, each of the compositions prepared in the working example 4 and the comparative examples 7 and 8 was pushed out as a sheet-shaped sample of a thickness of 2 mm, immediately after the composition had been prepared. The sheet-shaped sample was then exposed to an air of 23° C., 50% RH, and the physical properties (initial physical properties) of a cured product obtained by leaving such sheet under the same atmosphere for 3 days were measured in accordance with JIS K-6249. Here, a hardness of the cured product was measured with a durometer A hardness scale in accordance with JIS K-6249.

Furthermore, similar measurements were performed on such cured product that had been stored in a thermo-hygrostat of 85° C., 85% RH for seven days. Moreover, similar measurements were also performed on such cured product that had been heated in an oven of 150° C. for 10 days. In addition, each of the compositions prepared in the working example 4 and the comparative examples 7 and 8 was placed in a sealed container immediately after the composition had been prepared. The composition was then left at 70° C. for 7 days, and a sheet of a thickness of 2 mm was later formed of such composition that had been left at 70° C. for 7 days. Similar measurements were then performed on a cured product obtained by leaving such sheet of 2 mm in the air of 23° C., 50% RH for 3 days.

These results are shown in Table 4.

TABLE 4

| Measurement result | | Working example 4 | Comparative example 7 | Comparative example 8 |
|---|---|---|---|---|
| Tack-free time (min) | | 10 | 60< | 60< |
| Initial RTV 3 days | Hardness (Durometer A) | 35 | 33 | 34 |
| | Elongation (%) | 150 | 140 | 160 |
| | Tensile strength (MPa) | 1.4 | 1.3 | 1.4 |
| Heat resistance 150° C. 10 days | Hardness (Durometer A) | 34 | 25 | 28 |
| | Elongation (%) | 170 | 210 | 260 |
| | Tensile strength (MPa) | 1.5 | 1.2 | 0.9 |
| Moisture resistance 85° C./ 85% RH 7 days | Hardness (Durometer A) | 35 | 30 | 18 |
| | Elongation (%) | 160 | 150 | 180 |
| | Tensile strength (MPa) | 1.4 | 1.3 | 0.9 |
| Storage 70° C., 7 days RTV | Hardness (Durometer A) | 36 | 20 | 33 |
| | Elongation (%) | 150 | 200 | 120 |
| | Tensile strength (MPa) | 1.5 | 1.1 | 0.9 |

However, the present invention is not limited to the aforementioned working examples. The working examples are simply introduced as examples, and any examples may be included in the technical scope of the present invention if they substantively share an identical structure with and bring about the similar functions and effects as the technical ideas described in the scope of claim of the present invention.

The invention claimed is:

1. A room temperature-curable organopolysiloxane composition comprising:
   (A) an alkoxysilyl-ethylene group-terminated organopolysiloxane having in one molecule at least one group represented by the following structural formula (1)

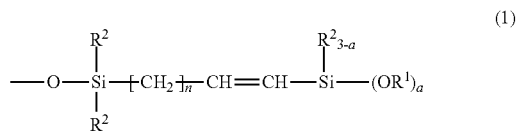

wherein $R^1$ represents an alkyl group that has 1 to 20 carbon atoms and may have one or more substituent groups, and when said alkyl group has 3 or more carbon atoms it may be a cycloalkyl group; $R^2$ represents a hydrocarbon group that has 1 to 20 carbon atoms and may have one or more substituent groups; a represents an integer of 1 to 3; and n represents an integer of 0 to 10;
   (B) an organopolysiloxane in an amount of 10 to 250 parts by mass with respect to 100 parts by mass of said component (A), and represented by the following general formula (2)

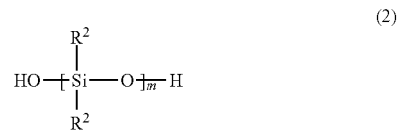

wherein $R^2$ represents a hydrocarbon group that has 1 to 20 carbon atoms and may have one or more substituent groups; and m represents a number at which the organopolysiloxane exhibits a viscosity of 10 to 1,000,000 mPa·s at 25° C.; and
   (C) a curing catalyst in an amount of 0.001 to 20 parts by mass with respect to 100 parts by mass of said component (A).

2. The room temperature-curable organopolysiloxane composition according to claim 1, wherein said component (A) is a linear organopolysiloxane whose main chain comprises repetitive diorganosiloxane units.

3. The room temperature-curable organopolysiloxane composition according to claim 2, wherein said component (A) is at least one alkoxysilyl-ethylene group-terminated organopolysiloxane selected from the diorganopolysiloxanes represented by the following general formulae (A) and (B)

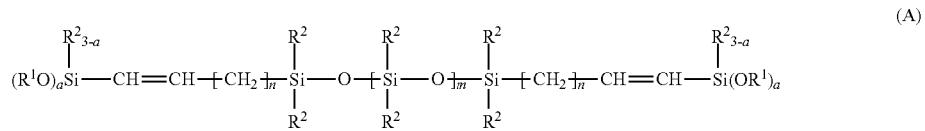

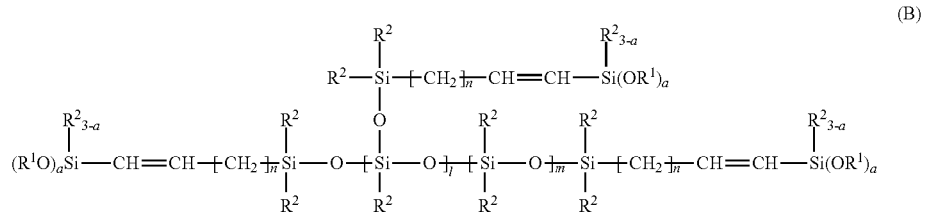

wherein $R^1$ represents an alkyl group that has 1 to 20 carbon atoms and may have one or more substituent groups, and when said alkyl group has 3 or more carbon atoms it may be a cycloalkyl group; $R^2$ represents a monovalent hydrocarbon group that has 1 to 20 carbon atoms and may have one or more substituent groups; a represents an integer of 1 to 3; n represents an integer of 0 to 10; and each of 1 and m represents an integer of 0 to 2,000.

4. The room temperature-curable organopolysiloxane composition according to claim 1, further comprising at least one of the following components (D) to (G) in amounts of the following parts by mass with respect to 100 parts by mass of said component (A):
(D) a hydrolyzable silane and/or a partial hydrolysis condensate thereof in an amount of 0.1 to 30 parts by mass;
(E) a filler in an amount of 1 to 1,000 parts by mass;
(F) an adhesion promotor in an amount of 0.1 to 30 parts by mass; and
(G) an organopolysiloxane in an amount of 1 to 100 parts by mass and represented by the following structural formula (3)

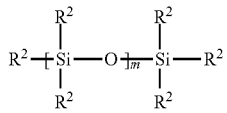

wherein $R^2$ represents a hydrocarbon group that has 1 to 20 carbon atoms and may have one or more substituent groups; and m represents an integer of 1 to 2,000.

5. The room temperature-curable organopolysiloxane composition according to claim 4, wherein said composition is a two liquid-type comprising:
an organopolysiloxane composition I comprising said components (A) and (C) and optionally said component (G) and/or said component (E); and
an organosiloxane composition II comprising said component (B) and optionally said component (D) and/or said component (E).

6. The room temperature-curable organopolysiloxane composition according to claim 5, wherein said component (F) and/or said component (G) are present in said organosiloxane composition I and/or said organosiloxane composition II.

7. A sealing agent, coating agent or adhesive agent comprising the room temperature-curable organopolysiloxane composition according to claim 1.

8. A cured product of the room temperature-curable organopolysiloxane composition according to claim 1.

9. A molded product comprising the cured product according to claim 8.

10. The room temperature-curable organopolysiloxane composition according to claim 2, further comprising at least one of the following components (D) to (G) in amounts of the following parts by mass with respect to 100 parts by mass of said component (A):
(D) a hydrolyzable silane and/or a partial hydrolysis condensate thereof in an amount of 0.1 to 30 parts by mass;
(E) a filler in an amount of 1 to 1,000 parts by mass;
(F) an adhesion promotor in an amount of 0.1 to 30 parts by mass; and
(G) an organopolysiloxane in an amount of 1 to 100 parts by mass and represented by the following structural formula (3)

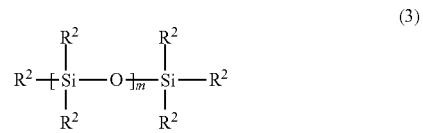

wherein $R^2$ represents a hydrocarbon group that has 1 to 20 carbon atoms and may have one or more substituent groups; and m represents an integer of 1 to 2,000.

11. The room temperature-curable organopolysiloxane composition according to claim 3, further comprising at least one of the following components (D) to (G) in amounts of the following parts by mass with respect to 100 parts by mass of said component (A):
(D) a hydrolyzable silane and/or a partial hydrolysis condensate thereof in an amount of 0.1 to 30 parts by mass;
(E) a filler in an amount of 1 to 1,000 parts by mass;
(F) an adhesion promotor in an amount of 0.1 to 30 parts by mass; and
(G) an organopolysiloxane in an amount of 1 to 100 parts by mass and represented by the following structural formula (3)

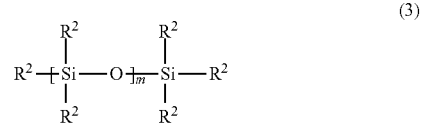

wherein $R^2$ represents a hydrocarbon group that has 1 to 20 carbon atoms and may have one or more substituent groups; and m represents an integer of 1 to 2,000.

* * * * *